United States Patent
Thomas

(10) Patent No.: US 10,423,349 B2
(45) Date of Patent: Sep. 24, 2019

(54) LOGICAL AND PHYSICAL ADDRESS FIELD SIZE REDUCTION BY ALIGNMENT-CONSTRAINED WRITING TECHNIQUE

(71) Applicant: Western Digital Technologies, Inc., San Jose, CA (US)

(72) Inventor: Nicholas James Thomas, Edinburgh (GB)

(73) Assignee: Western Digital Technologies, Inc., San Jose, CA (US)

( * ) Notice: Subject to any disclaimer, the term of this patent is extended or adjusted under 35 U.S.C. 154(b) by 87 days.

(21) Appl. No.: 15/684,206

(22) Filed: Aug. 23, 2017

(65) Prior Publication Data

US 2019/0065094 A1 Feb. 28, 2019

(51) Int. Cl.
*G06F 3/06* (2006.01)
*G06F 12/02* (2006.01)

(52) U.S. Cl.
CPC .......... *G06F 3/0638* (2013.01); *G06F 3/061* (2013.01); *G06F 3/0656* (2013.01); *G06F 3/0679* (2013.01); *G06F 12/023* (2013.01)

(58) Field of Classification Search
CPC ...... G06F 3/0638; G06F 3/061; G06F 3/0656; G06F 3/0679; G06F 12/023
See application file for complete search history.

(56) References Cited

U.S. PATENT DOCUMENTS

| | | | | | |
|---|---|---|---|---|---|
| 5,835,963 | A | * | 11/1998 | Yoshioka | G06F 12/1054 711/207 |
| 6,163,833 | A | * | 12/2000 | Kim | G06F 13/385 710/52 |
| 9,189,309 | B1 | * | 11/2015 | Ma | G06F 11/3034 |
| 2003/0105940 | A1 | * | 6/2003 | Cooksey | G06F 12/0215 711/203 |
| 2004/0002049 | A1 | * | 1/2004 | Beavers | G09B 5/00 434/350 |
| 2004/0098495 | A1 | * | 5/2004 | Warren | G06F 9/544 709/230 |
| 2010/0235569 | A1 | * | 9/2010 | Nishimoto | G06F 3/064 711/103 |
| 2016/0335195 | A1 | * | 11/2016 | Kawamura | G06F 12/0246 |
| 2017/0235636 | A1 | * | 8/2017 | Zhou | G06F 3/06 714/764 |
| 2018/0150220 | A1 | * | 5/2018 | Pandian | G06F 3/061 |

* cited by examiner

*Primary Examiner* — Nanci N Wong
(74) *Attorney, Agent, or Firm* — Patterson & Sheridan, LLP; Steven Versteeg

(57) ABSTRACT

A method that uses a reduced logical and physical address field size for storing data having steps of receiving a set of data to write to a solid state drive, determining a logical address to the set of data, setting a logical offset of the set of data to be equal to a physical block offset modulo of the data and writing the set of data to the solid state drive in locations on solid state drive that accept a size of the address of the set of data is disclosed.

29 Claims, 3 Drawing Sheets

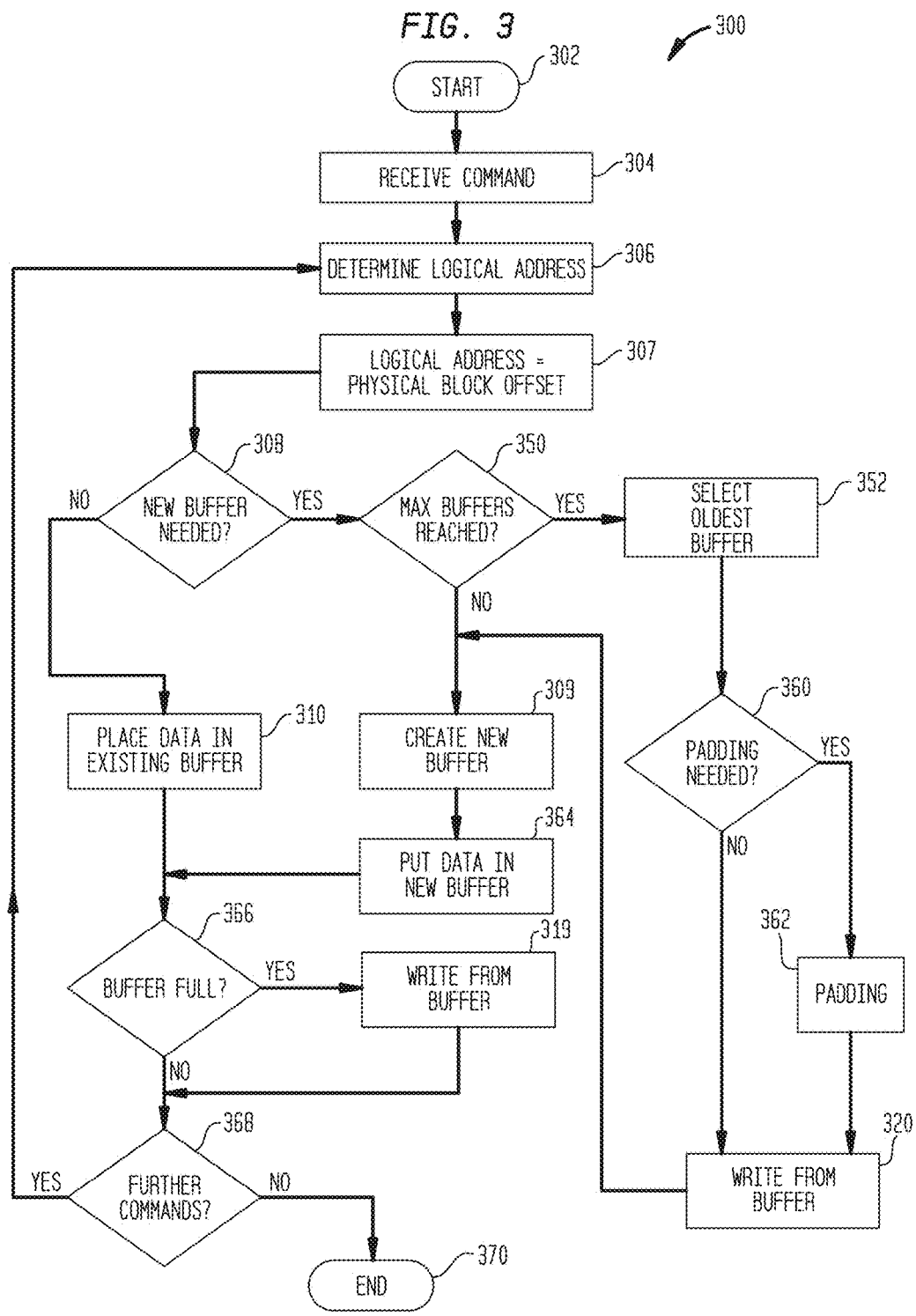

LOGICAL AND PHYSICAL ADDRESS FIELD SIZE REDUCTION BY ALIGNMENT-CONSTRAINED WRITING TECHNIQUE

BACKGROUND INFORMATION

Field of the Disclosure

Aspects of the disclosure relate to data storage devices. More specifically, aspects relate to a method of using constrained data address field sizes to aid in storing data to data storage devices.

Description of the Related Art

Solid state drives (SSD) are becoming increasingly important for enterprise solutions to corporate data storage requirements. These drives are being required to perform more operations as internet activities and the need for quick and accurate data storage increases. Advantageously, as technology increases, solid state drives are becoming more economical to produce.

SSD performance can be lacking, however, when quick access to data is needed but the drive is not either designed or optimized for quick access activities. To combat non-optimization, SSD performance can be enhanced by altering the SSD hardware or by changing the processes by which the hardware operates. Even with the best hardware designs, however, the overall performance of a SSD may not be optimal if the software or processes that the SSD uses are not efficient.

Logical storage of data on SSD systems can aid in the overall performance of the SSD, however addressing of data fields in a SSD has been an overlooked feature in performance operations. As SSDs grow in logical complexity and physical capacity, conventional addressing systems and methods are challenged to maintain and manage the data organizational complexity. Typically, when address fields extend beyond certain boundaries, a step loss in efficiency is encountered in the handling of those new field sizes. This inefficiency results from more complex access (no bit shift operations to calculate offsets) and/or additional field padding. As SSD gain higher capacity, operations such as field padding eventually become performance bottlenecks. To handle these types of access problems, systems are often provided with expanded hardware (such as higher capacity memory). As the memory capacity of storage systems increases and becomes more complex, such potential operational problems encountered may require component manufacturers to limit the operational parameters of such systems so problems are not encountered by an end user. For higher capacity drives, manufacturers incorporate more random access memory to perform SSD activities such as writing and reading. As will be understood, however, systems that require higher capacity memory are not as economical to produce. Manufacturers are therefore faced with difficult design decisions wherein increased performance requirements can lead to prohibitively costly SSD units.

There is a need to provide a SSD that has improved organizational capabilities compared to conventional systems. There is also a need to provide an efficient addressing system that is applicable to SSD operations. There is a further need to provide a SSD that provides an improved quality of service to the user. Still further, there is a need to provide a SSD that is economical to produce compared to conventional designed SSD units. There is a still further need to provide enterprise oriented SSD units that do not use excessive amounts of RAM.

SUMMARY

So that the manner in which the above recited features of the present disclosure can be understood in detail, a more particular description of the disclosure, briefly summarized below, may be had by reference to embodiments, some of which are illustrated in the appended drawings. It is to be noted that the appended drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

The present disclosure provides a method having steps of receiving a set of data to write to a solid state drive, determining a logical address to the set of data, setting a logical offset of the set of data to be equal to a physical block offset modulo of the data and writing the set of data to the solid state drive in locations on solid state drive that accept a size of the address of the set of data.

In another example embodiment, an apparatus is disclosed having means for receiving a command to write a set of data to a solid state drive, means for determining a logical address to the set of data, means for setting a logical offset of the set of data to be equal to a physical block offset modulo of the data and means for writing the set of data to the solid state drive in locations on solid state drive that accept a size of the address of the set of data.

Other aspects and advantages will become apparent from the following description and the attached claims.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 3 is a method for an alignment constrained writing technique in accordance with one embodiment of the disclosure.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
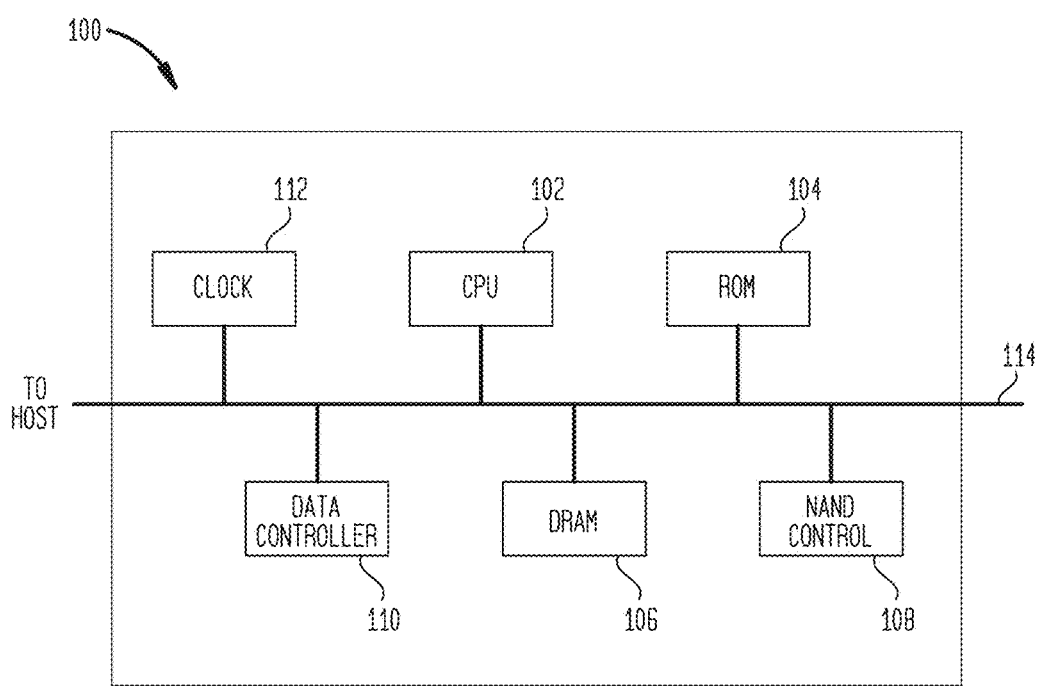
FIG. 1 is a schematic diagram of a SSD controller.

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim. Likewise, reference to "the disclosure" shall not be construed as a generalization of an inventive subject matter disclosed herein and shall not be considered to be an element or limitation of the appended claims except where explicitly recited in a claim.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art that some embodiments may be practiced without many of these details and that numerous variations or modifications from the described embodiments are possible. As used herein, the terms "above" and "below", "up" and "down", "upper" and "lower", "upwardly" and "downwardly", and other like terms indicating relative positions above or below a given point or element are used in this description to more clearly describe certain embodiments.

Solid state drives are configured from multiple sets of flash memory elements placed in a logical order to allow a user to store information in the drive. These flash memory elements, however, are not the only components of a SSD. SSD have other components, such as controllers that use other forms of memory to allow the SSD to operate. One such memory type used by a controller is dynamic random access memory (DRAM). Typically, DRAM stores bits of data in a storage cell. DRAM is defined as a dynamic type of memory due to the configuration of the storage cell. The typical DRAM storage cell has a capacitor and a transistor placed within the cell. Over time, although initially charged by an electrical source, the charge may leak from the capacitor. To maintain the storage cell in an operative state therefore a refreshing electric charge may be provided to the capacitor in the storage cell to maintain the state of charge. DRAM is considered a fast access type of memory that allows systems that use it respond more quickly to user commands.

While data may be stored in DRAM as detailed above, for ultimate use by a processor in the SSD controller, the economics of incorporating large amounts of DRAM is not practical as DRAM is relatively cost prohibitive to use in large quantities. An aspect of the disclosure described herein minimizes the expensive DRAM component in a solid state drive without compromising on overall drive efficiency. The resulting solid state drive therefore may have fast access times and an economical production. As SSDs get larger, the cost savings for production can be large as relatively unused DRAM is minimized and existing systems are utilized to their full potential.

A typical SSD is described. Although a specific type of SSD is described, the aspects described may be equally used in other SSDs or arrangements. The aspects described may therefore be used in single SSDs or SSDs that are connected into a bank or system of drives, such as those used in enterprise applications. In SSDs, the associated flash memory may be divided into a number of distinct areas. Access to these memory areas is strictly controlled, wherein certain areas are not accessible by certain components or systems. As a result, the memory areas are specifically delineated for certain functions.

Operational capability and functions for the SSD are maintained through a controller. As a non-limiting embodiment, a controller may have the capability to access four (4) areas of flash designated memory, namely a first system area that holds important flash memory and/or system information, a second data area, a third spare area and a fourth replacement area. A host, namely a computer system or server wishing to access the data or store data, may directly access only the data memory area and spare memory area. Access to the system area and the replacement area are governed by the controller incorporated into the SSD.

The process by which data is written into a SSD may vary. In one non-limiting embodiment, a write command is received from a host (either a personal computer, server or electrically connected device) to write data in the data memory area of the SSD. A physical block (a subdivision of the entire memory area) in the flash memory is then selected from the spare area by the controller for further processes. If there is data in the physical block of the flash memory in the data area, as chosen by the controller, this previously written data is then written into a controller selected block in the spare area along with any new data that is to be written by the write command received from the host. A link to the newly written data (both new and old) is then provided in the data area so that the all of the data (new and old) may then be found if later access is needed. The data block used in the spare area may then be designated as a data area. Optionally, an erase command may then be initiated in the data area for the data block involved where the old data was located, thereby freeing the system of storage that is not needed.

The actions that are performed by the SSD, such as those above, illustrate that addressing data blocks in an efficient manner may increase the overall speed of the SSD. Addresses that are long, complicated and imprecisely placed within the SSD require extra search and access time, impacting the overall quality of service (QoS). For purposes of definition, quality of service is defined as the overall level of service of a computer system from the perspective of the user. Improperly writing data into memory areas may result in large amounts of unused storage area and may cause excessive wait times for the user.

A more detailed description of the components that effect the writing and reading process of a SSD are discussed. The embodiment described should be considered non-limiting. A SSD controller 100 is illustrated in FIG. 1. The controller 100 is provided with a CPU 102 that performs necessary calculations and generates operative command functions for the controller 100. The CPU 102 has accessible read only memory (ROM) 104 for instructions which are accessed when needed. Such ROM 104 is a non-volatile memory so that when electricity is severed from the controller 100, the data in the ROM 104 may be accessed in the future and not lost. Although described as read only memory 104, other types of memory, such as erasable programmable read only memory (EPROM) memory may be used. Electrically erasable programmable read only memory (EEPROM) memory may also be used. The use of EPROM or EEPROM memory would allow for limited reprogramming of ROM functions, if reprogramming is necessary. The use of EPROM or EEPROM memory, therefore, would allow for greater system adaptability and correction of inadvertent errors in the ROM 104.

To aid in operability of the SSD, upon a power connection, the contents of the ROM 104 may be copied to DRAM 106 for access or may be directly accessible by the CPU 102 at desired intervals in a process called ghosting. The copying of the ROM 104 to DRAM 106 may occur because DRAM 106 may have faster access speeds than the access speed of the ROM 104 causing a net speed increase of the controller 100 and resulting increase in performance for the user. The DRAM 106 is configured to provide a temporary data storage area for the CPU 102 for data entering or exiting the CPU 102. Larger demands from the CPU 102 may necessitate larger amounts of DRAM 106 as increased memory may be needed. A NAND controller 108 may be placed on a bus 114 to receive requests by the CPU 102 and interconnect with attached NAND flash memory (not shown). The NAND controller 108 may organize functions related to storage and operations of the NAND storage device. The bus 114, therefore, may provide the interconnection needed to send data to and from the controller 100 for usage. A host (computer or server) interconnection with the controller 100 may be performed by a serial attached technology attachment (SATA) controller 110 or other interface protocol. The bus 114 may be configured as a single bus, as shown, or may have multiple layers/interconnections. Although described as a SATA controller 110, other types of controllers and communication protocols may be used at the discretion of the system architect. Clock functions may be performed in the controller 100 by a clock 112. A capacitor or battery may be provided to the components for the controller 100 to enable the components of the controller 100 to have a capability to withstand a loss of electrical power scenario. Although described as having a clock 112, other configurations are possible, including using a host for clock functions as necessary.

In one non-limiting embodiment of the disclosure, a method is disclosed for controller functions that is suitable for the enterprise SSD market, namely larger SSD that require high reliability and storage capacity while minimizing the amount of DRAM 106 present in a SSD. Such functions may be performed by the CPU 102 as illustrated in FIG. 1. The functions described provide for a logical and physical address field size reduction by an alignment constrained writing technique.

As provided above, conventional SSD may have relatively large amounts of DRAM 106 associated with the drive to facilitate drive functions, such as reading, writing and erasing. The method presented herein allows logical and physical field sizes to be reduced by a constrained writing technique. The method, for example, allows large capacity drives with marginal DRAM budget, to reduce DRAM 106 footprint by roughly 10%, thus enabling smaller and therefore cheaper DRAM units 106 to be used in the SSD driving down the overall cost of the SSD.

The methods described rely on deliberately constraining the locations where any data may be written governed by the logical address of the data. This method applies to host data and relocation data streams. The logical address is hereto defined as the address at which an item appears to reside pursuant to an executing application program. The logical address of a set of data is not necessarily the same as the physical address of the data.

The constraint created by the method forces a logical offset and physical block offset modulo 'A', (the number of possible allowed alignments), to be equal. For purposes of definition, the logical offset is defined as an integer defining a distance or displacement between a start of an object and a point or element within the same object. Thus, the locations where data may be written in the solid state drive are constrained to a specific number of locations. This writing technique, therefore, offers a distinct advantage compared to other unconstrained writing techniques as the volatile memory mapping is more fully utilized. Less DRAM 106 capacity is needed in the SSD as less memory is needed for storing information used by the CPU 102. Additionally, for data writing functions to the SSD, a number of buffers may be created to hold data to be written to the flash in an efficient manner and once the buffer is full, the data is subsequently written to the data area of the SSD. The present method, therefore, is particularly efficient when writing functions are continuous or frequently performed. When such writing operations are performed on a constant basis, the buffers created in the DRAM 106 are full before writing to the SSD and the data is efficiently stored with minimizing any padding to the data. As a result, having a number of buffers configured to receive information for storage, wherein these buffers do not need padding, provides a flexible and efficient method for storing information to a NAND flash unit connected to the bus 114. As will be understood, a single buffer may be used as well as numerous buffers in various embodiments. In another alternative embodiment, a great number of buffers than 64 may be used.

As a non-limiting example, if the number of possible alignments for data storage is 8, then the possible number of write locations is greatly diminished compared to an entire drive using conventional writing techniques.

As a non-limiting embodiment, the more definite or constrained the logical and physical address field is, then the more potentially efficient the SSD. In a further example embodiment, the data is not laid out in physical locations in the SSD in the order that the data is received. The data, rather, may be reordered within the SSD system to the extent to allow for efficient storage and/or logical sorting of the data in future activities. Buffers created, for example in the DRAM 106, are filled to their capacity by the controller 100 so that little or minimal padding is needed in each buffer prior to writing of the data to the data area of the SSD. After the buffer is filled (or is nearly filled), a write operation is started to store the information in an attached NAND flash storage.

Figure 2:
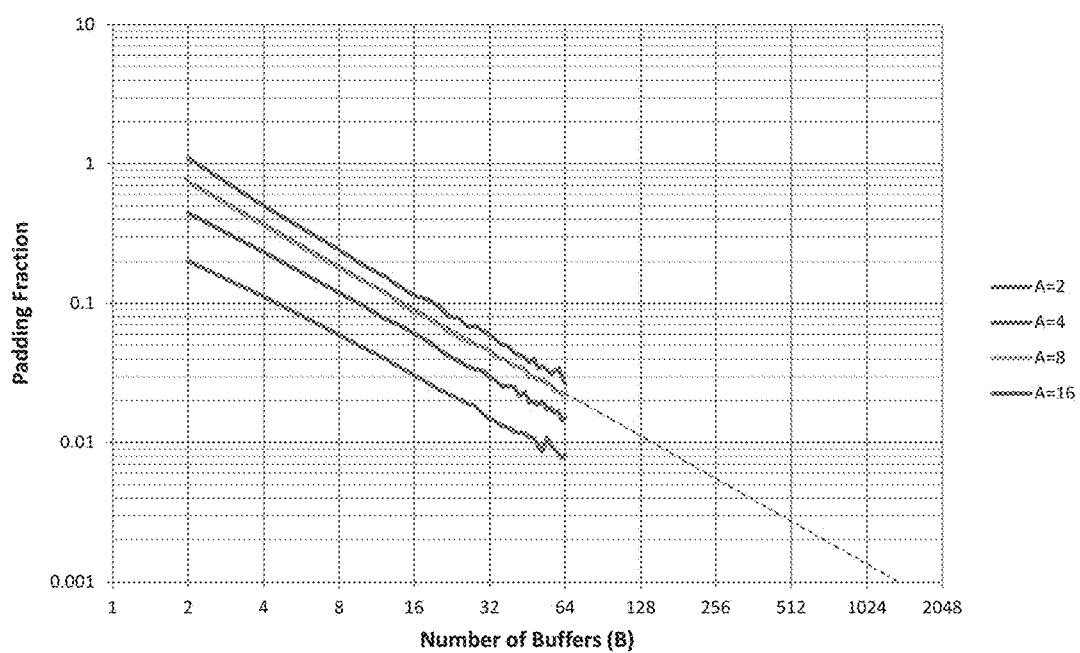
FIG. 2 is a graph of padding fraction vs. number of buffers.

In order to make reordering of the data possible, the data is placed in a temporary memory (buffer) in order to allow for storage until needed and ultimately written to the NAND flash. The temporary memory buffer is provided by the DRAM 106. As more information is processed, the number of buffers increases as the logical sequence of storage is developed by the system. As will be understood by a person of skill in the art, the number of buffers may continue to increase pursuant to the number of operations performed. In the illustrated embodiment presented in FIG. 2, the number of buffers for most cases presented is between 2 and 64. In FIG. 2, the number of buffers ranges A=16 for the top graph, A=8 for the graph below the top graph, A=4 for the graph below the A=8 graph and A=2 for the bottom most graph. In the instance where A=8, the number of buffers extends above 1024 buffers when a padding fraction decreases to a value of 0.001. The number of buffers may be selected by a system architect to allow for an adequate number of buffers without requiring an excessive amount of DRAM 106.

As a non-limiting embodiment, because the granularity of write access is typically smaller than the smallest programmable unit (e.g. 4 KB logical address unit versus 32 KB program unit) it is necessary to buffer the data before writing in order to accumulate data in all slots within the program unit. The value of 'A' may be chosen by a system architect to be such that only one unique slot per alignment exists in each program unit (e.g. A=8 for 4 KB logical address unit and 32 KB program unit), or less or greater, as desired.

When only one logical alignment can be made, the respective buffer may be emptied to the location on the SSD that aligns with the data.

The example embodiment differs from the conventional multiple-flash transition layer (FTL)/multiple independent die group approach for writing data onto a SSD. The flash transition layer (FTL) specification is defined as a conventional specification developed by the Personal Computer Memory Card International Association. The conventional FTL approach provides that all data may reside on any die (for A≤diepage size).

There are other advantages for this alignment constrained writing technique compared to conventional FTL techniques. The alignment presented herein is based on the smallest logical unit, therefore there are fewer concerns about "hot" logical block addressing issues wherein certain logical block addressing get a higher access rate thereby causing repeated read/write issues. This issue manifests where the interleaving of logical based addressing space between FTLs is at a higher granularity and all or most hot logical based addressing space happens to be allocated unequally across FTLs. Additionally there are no concerns about the 'slowest' FTL (caused by slowest programming speed, and/or lowest over-provisioning) using large amounts of buffer resources and slowing the entire system. An advantage, therefore, is that an embodiment described uses one FTL while conventional systems would need multiple FTLs.

The method described in FIG. 3, recites that certain data should be padded if any of the A alignments of data are not present in a buffer as it is written to flash. To reduce this probability, more buffers are required, such that data can continue to accumulate in these added buffers until a buffer fills completely and is written and subsequently freed before data is received for an alignment for which there is no spare buffer. A numerical solution to the padding fraction generated with A alignments and B buffers (each of size A logical units) is presented and a relationship is provided in FIG. 2. As will be understood, a continually larger number of buffers may be provided so that data may be placed in the buffers without need or minimally needing padding prior to write functions to the NAND flash.

The padding fraction effectively reduces the over-provisioning in the system and therefore can have a negative consequence on system performance. For definitional purposes, over-provisioning is defined as a total flash memory available to the flash processor CPU 102 to perform various functions. For a given target max padding fraction (and therefore max over-provisioning loss) buffer requirements may be calculated. As presented, the relationship is a straight line relationship in log space provided in FIG. 2. As will be understood, the relationship will be different than a straight line relationship in other graphing instances.

Referring to FIG. 3, a method 300 for reduction of logical field size by alignment constrained writing technique is illustrated. The method starts at 302 and a command for writing a set of data to an SSD is received at 304. This request may come from a host, to the CPU 102 of the controller 100. The CPU 102 may have an interface module configured to allow communication between the host and the CPU 102. At 306, the logical address of new data to be written is determined. At 307, the logical offset of the data to be written is made equal to the physical block offset. At 308 a query is performed to identify if a new buffer is needed. If a new buffer is needed at 308, the method proceeds to 350. If no buffer is needed, the method proceeds to 310.

At 350, a query is made to determine if a maximum number of memory buffers has been reached (as designated by a system architect). If the maximum number of buffers has not been reached, then at 309 a new buffer is created. At 310, if no new buffer is needed at 308, data is placed in an existing buffer and the method progresses to query 366 which determines if the buffer is full. If the buffer is full at 366, a write from the buffer occurs at 319 to the SSD using the logical and physical address field that has been constrained by alignment and the method proceeds to 368.

At 308, if a new buffer is needed, the process continues to 350 where a query is run to determine if a maximum number of buffers has been reached. If the maximum number of buffers is not reached at 350, the method proceeds to 309, a new buffer is created and data is placed in the new buffer at 364. The method then continues to 366. If at 366 a buffer is not full, a query is run at 368 to determine if more data is required to be processed. If further commands are not required to be processed, the method proceeds to 370 and the process ends. If further commands are required to be processed at 368, the method progresses back to 306.

If, at 350, the maximum number of buffers has been reached, then the method progresses to 352 where the oldest buffer is selected and the process continues to query 360 to determine if padding is needed for the buffers. If padding is not needed at 360, then the method continues to 320. If padding is needed at 360, then the method progresses to 360 where padding is added at 362 and the method thereby continues to 320. After step 320, the method proceeds back to 309. As will be evident, an additional padding step may be added to the method if desired, at different locations and there is a need to minimize the number of buffers for the process. A step of padding may also be deleted, if it is desired to have data stored without padding.

As described above, the method 300 provided is very effective for systems that continually receive data write requests. Such activities are typically required in enterprise type applications, such as data centers where multiple users are continually processing data. The current application uses the smallest logical address unit 4 KB for processing of the data. Although described as being applicable to 4 KB addresses, other address sizes may be used.

In one non-limiting embodiment, a method is disclosed. The method comprises receiving a set of data to write to a SSD, determining a logical address to the set of data, setting a logical offset of the set of data to be equal to a physical block offset modulo of the data and writing the set of data to the SSD in locations on SSD that accept a size of the address of the set of data.

In another non-limiting embodiment, the method may further comprise writing the set of data to a buffer prior to the writing of the set of data to the SSD.

In another non-limiting embodiment, the method may be performed wherein the physical block offset is equal to a number of possible allowed alignments.

In another non-limiting embodiment, the method may be performed wherein the writing of the set of data is in a reordered configuration from an original configuration for the set of data.

In another non-limiting embodiment, the method may be performed wherein the number of possible allowed alignments is chosen by one of a user and a system architect.

In another non-limiting embodiment, the method may be performed wherein the number of alignments is one unique slot arrangement for each program unit.

In another non-limiting embodiment, the method may further comprise padding the set of data to fill the buffer.

In another non-limiting embodiment, the method may be performed wherein the writing occurs when the buffer is full of data.

In another non-limiting embodiment, the method may be performed wherein the buffer is to at least two buffers.

In another non-limiting embodiment, the method may be performed wherein a number of the at least two buffers is provided by a mathematical relationship.

In another non-limiting embodiment, the method may be performed wherein the mathematical relationship is a straight line relationship pertaining to a graph of a padding fraction verses a number of buffers.

In another non-limiting embodiment, the method may further comprise establishing a maximum number of buffers and comparing a number of buffers created to the maximum number of buffers.

In another non-limiting embodiment, the method may further comprise creating a new buffer for data to be added when the number of buffers created does not equal the maximum number of buffers.

In another non-limiting embodiment, the method may further comprise checking if a further command to write a set of data is received.

In another non-limiting embodiment, the method may further comprise writing all data in the buffers if no further command is received.

In another non-limiting embodiment, the method may further comprise writing the data to the solid state drive when either the buffer and the new buffer are full.

In another non-limiting embodiment, the method may further comprise padding at least one of the buffer and the new buffer to fill the buffer.

In another non-limiting embodiment, the method may be performed wherein a maximum size of the logical address is 4 KB.

In another non-limiting embodiment, the method may be performed wherein the writing the set of data to the solid state drive in locations on solid state drive that accept the size of the address of the set of data is accomplished at a plurality of die.

In another non-limiting embodiment, the method may be performed wherein the set of data to be written is less than a page.

In another non-limiting embodiment, an apparatus is disclosed comprising means for receiving a command to write a set of data to a solid state drive, means for determining a logical address to the set of data, means for setting a logical offset of the set of data to be equal to a physical block offset modulo of the data and means for writing the set of data to the solid state drive in locations on solid state drive that accept a size of the address of the set of data.

In another non-limiting embodiment the apparatus may further comprise means for creating a buffer for storing data.

In another non-limiting embodiment, the apparatus may further comprise means for padding a buffer with data.

While embodiments have been described herein, those skilled in the art, having benefit of this disclosure will appreciate that other embodiments are envisioned that do not depart from the inventive scope of the present application. Accordingly, the scope of the present claims or any subsequent related claims shall not be unduly limited by the description of the embodiments described herein.

What is claimed is:

1. A method, comprising:
   receiving a set of data to write to a solid state drive;
   determining a logical address to the set of data;
   setting a logical offset of the set of data to be equal to a physical block offset modulo of the physical address of the data; and
   writing the set of data to the solid state drive in locations on the solid state drive that accept a size of the address of the set of data, wherein the physical block offset modulo of the physical address of the data is equal to one unique slot arrangement for each program unit.

2. The method according to claim 1, further comprising: writing the set of data to a buffer prior to the writing of the set of data to the solid state drive.

3. The method according to claim 2, wherein the buffer has at least two buffers.

4. The method according to claim 3, wherein a number of the at least two buffers is provided by a mathematical relationship.

5. A method, comprising:
   receiving a set of data to write to a solid state drive;
   determining a logical address to the set of data;
   setting a logical offset of the set of data to be equal to a physical block offset modulo of the physical address of the data; and
   writing the set of data to the solid state drive in locations on the solid state drive that accept a size of the address of the set of data writing the set of data to a buffer prior to the writing of the set of data to the solid state drive wherein the buffer has at least two buffers wherein a number of the at least two buffers is provided by a mathematical relationship, wherein the mathematical relationship is a straight line relationship in log space pertaining to a graph of a padding fraction verses a number of buffers.

6. The method according to claim 1, wherein the physical block offset is equal to a number of possible allowed alignments.

7. The method according to claim 1, wherein the writing of the set of data is in a reordered configuration from an original configuration for the set of data.

8. The method according to claim 6, wherein the number of possible allowed alignments is chosen by one of a user and a system architect.

9. A method, comprising:
   receiving a set of data to write to a solid state drive;
   determining a logical address to the set of data;
   setting a logical offset of the set of data to be equal to a physical block offset modulo of the physical address of the data; and
   writing the set of data to the solid state drive in locations on the solid state drive that accept a size of the address of the set of data wherein the physical block offset is equal to a number of possible allowed alignments wherein the number of alignments is one unique slot arrangement for each program unit.

10. The method according to claim 2, further comprising: padding the set of data to fill the buffer.

11. The method according to claim 7, wherein the writing occurs when a buffer is full of data.

12. The method according to claim 1, further comprising:
    establishing a maximum number of buffers; and
    comparing a number of buffers created to the maximum number of buffers.

13. The method according to claim 12, further comprising:
    creating a new buffer for data to be added when the number of buffers created does not equal the maximum number of buffers.

14. The method according to claim 1, further comprising: checking if a further command to write a set of data is received.

15. The method according to claim 14, further comprising:
  writing all data in a buffer if no further command is received.

16. The method according to claim 13, further comprising:
  writing the data to the solid state drive when either of the buffer or the new buffer are full.

17. The method according to claim 16, further comprising:
  padding at least one of the buffer and the new buffer to fill the buffer.

18. The method according to claim 1, wherein a maximum size of the logical address is 4 KB.

19. The method according to claim 1, wherein the writing the set of data to the solid state drive in locations on solid state drive that accept the size of the address of the set of data is accomplished at a plurality of die.

20. The method according to claim 1, wherein the set of data to be written is less than a page.

21. A method, comprising:
  receiving a set of data to write to a memory device;
  determining a logical address to the set of data;
  setting a logical offset of the set of data to be equal to a physical block offset modulo of the physical address of the data;
  determining if a maximum number of memory buffers has been reached;
  determining if a new buffer is needed for storage of information;
  creating a new buffer from memory when a new buffer is needed;
  writing the set of data to the new buffer;
  determining if the new buffer from memory is full with the set of data; and
  writing the set of data from the new buffer to the memory device when the new buffer is full, wherein the physical block offset modulo of the physical address of the data is equal to one unique slot arrangement for each program unit.

22. The method according to claim 21, wherein the memory device is a solid state drive.

23. The method according to claim 21, wherein the maximum number of memory buffers is 64.

24. The method according to claim 21, wherein the memory buffers are created in a volatile memory system.

25. A method, comprising:
  receiving a set of data to write to a memory device;
  determining a logical address to the set of data;
  setting a logical offset of the set of data to be equal to a physical block offset modulo of the physical address of the data;
  determining if a maximum number of memory buffers has been reached;
  determining if a new buffer is needed for storage of information;
  creating a new buffer from memory when a new buffer is needed;
  writing the set of data to the new buffer;
  determining if the new buffer from memory is full with the set of data;
  determining if more data is available for processing from a host; and
  writing contents of the new buffer to the memory device when no more data is available from the host, wherein the physical block offset modulo of the physical address of the data is equal to one unique slot arrangement for each program unit.

26. The method according to claim 25, wherein the memory device is a solid state disk.

27. The method according to claim 25, wherein the maximum number of memory buffers is 64.

28. The method according to claim 25, wherein the memory buffers are created in a volatile memory system.

29. The method according to claim 25, further comprising:
  writing contents of the new buffer when the memory is full with the set of data.

* * * * *